Aug. 27, 1968  J. DOKOUPIL ET AL  3,398,557

LEATHER SOFTENING MACHINE

Filed April 5, 1967

Inventors
Jiří Dokoupil, Václav
Opluštil, Jiří Zdráhal,
Jiří Zubík
By
Richard Low
Ag't United States Patent Office 3,398,557
Patented Aug. 27, 1968

3,398,557
LEATHER SOFTENING MACHINE
Jiří Dokoupil, Václav Opluštil, Jiří Zdráhal, and Jiří Zubik, Krnov, Czechoslovakia, assignors to Strojosvit Narodni Podnik, Krnov, Czechoslovakia
Filed Apr. 5, 1967, Ser. No. 628,752
Claims priority, application Czechoslovakia, June 13, 1966, 3,971/66
5 Claims. (Cl. 69—33)

ABSTRACT OF THE DISCLOSURE

A machine for softening leather in which the leather is passed horizontally between teeth mounted on upper and lower carriers, the lower carrier being vertically oscillated so that its teeth alternatingly project through a perforated work table and are rejected whereas the teeth of the upper carrier are normally stationary. A resilient pad between the upper teeth facilitates release of the leather from the teeth and permits passage of the leather through the machine without damage.

Background of the invention

This invention relates to leather working equipment, and particularly to a machine for softening pieces of leather.

Available automatic machinery for softening leather and similar sheet materials is limited in its application to large pieces of the material, and are economical only when used in large scale production. The material is flexed while being carried through a working area between two resilient conveyor belts. Manual or otherwise time-consuming methods were still employed heretofore in the softening of small leather pieces and in plants of small or medium capacity. The automatic equipment available heretofore cannot be adjusted economically for handling a sequence of leather pieces of which each requires a different amount of flexing.

The invention aims at providing a machine which permits such individual treatment of each piece of leather, and even different treatment for different portions of the same piece while greatly reducing the amount of labor required.

Summary of the invention

The machine of the invention has a normally horizontally extending perforated work table. A carrier mounted under the table is equipped with teeth respectively aligned with the perforations of the table and is oscillated during operation of the machine in such a manner that the teeth simultaneously project above the work table in one terminal position and are downwardly retracted in the other terminal position of the carrier.

A second tooth carrier is mounted on the supporting structure of the machine above the work table, and its teeth extend downward therefrom in the operative position of the second carrier into the gaps between the teeth of the lower carrier.

Other features and many of the attendant advantages of this invention will become readily apparent from the following detailed description of a preferred embodiment when considered in connection with the annexed drawing.

Description of the preferred embodiment

Figure 1:
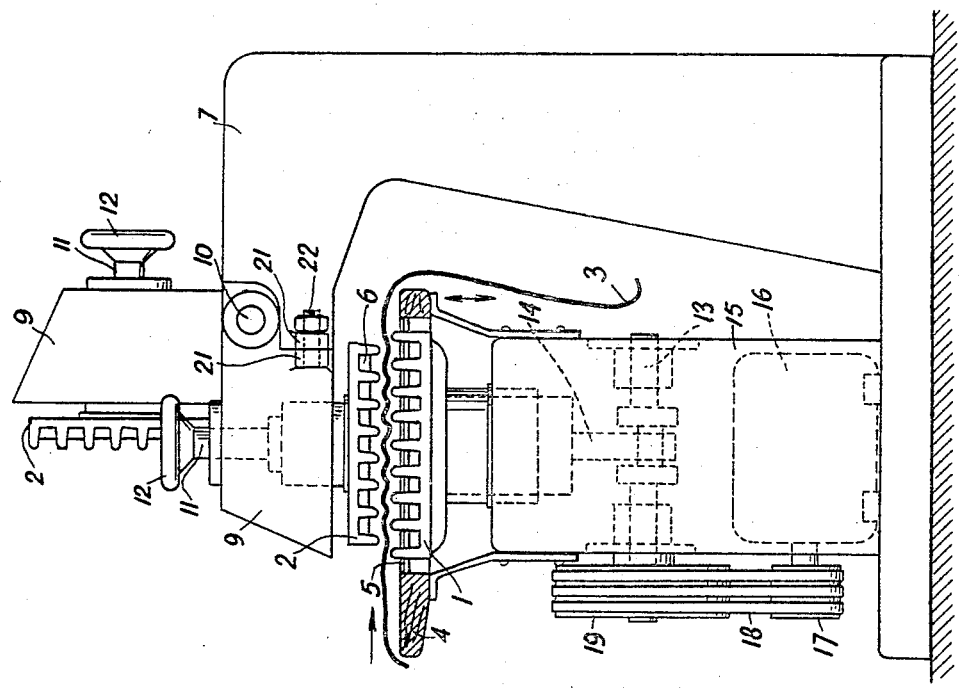
FIG. 1 shows a leather softening machine of the invention in side elevation.

Referring to the drawing in detail, there is seen a machine whose supporting structure consists mainly of an upright housing 15 and an upright column 7. A horizontal work table on the housing 15 consists essentially of a wooden frame 4 and a perforated metal sheet 5 inserted in the frame.

A lower tooth carrier 1 is guided in the housing 15 for vertical reciprocating movement as indicated by a double arrow in FIG. 1. It is vertically oscillated during operation of the machine by an electric motor 16 in the housing 15 whose drive pulley 17 is connected by belts 18 to a pulley 19 on a crankshaft 13. A connecting rod 14 is hingedly attached to the crank pin of the shaft 13 and to the carrier 1, and the stroke of the carrier 1 may be adjusted by varying the eccentricity of the crank pin on the shaft 13 in a conventional manner, not shown.

Vertically elongated teeth 8 extend upward from the carrier 1 in alignment with the perforations of the sheet 5. Their rounded free ends are retracted below the top face of the sheet 5 in their lowermost position, and they enter gaps between corresponding teeth 8 of two upper tooth carriers 2 in the other terminal position of their oscillating movement.

Figure 2:
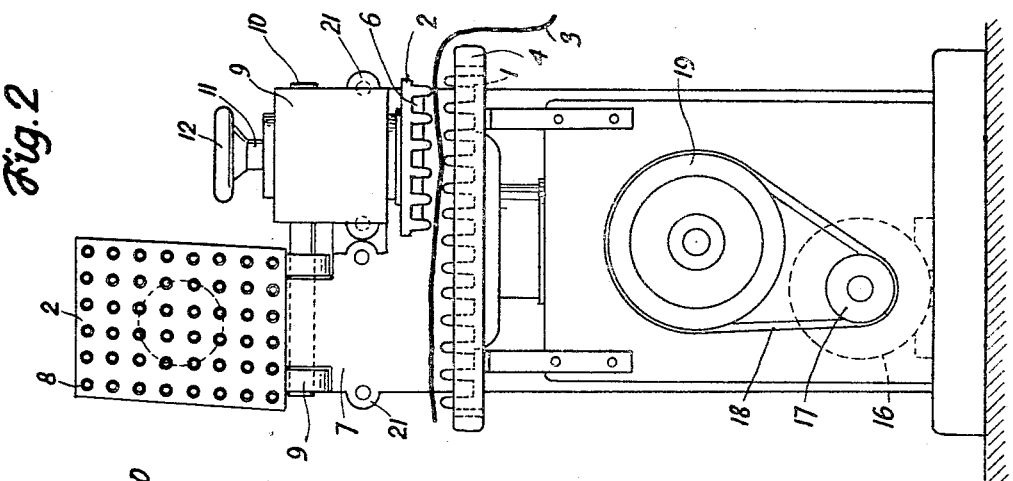
FIG. 2 shows the machine of FIG. 1 in front elevation.

Two arms 9 are mounted on the top end of the column 7 by means of a common pivot pin 10 for independent swinging movement between an operative position in which the arm extends horizontally from the column, and an inoperative position in which the arm is tilted upward from the operative position, the two arms being shown in FIGS. 1 and 2 in the operative and inoperative positions respectively.

One of the two upper tooth carriers 2 is slidably mounted on each arm 9 and secured against rotation. A spindle 11 threadedly received in the arm and equipped with a handwheel 12 permits the teeth 8 on each carrier 2 in the operative position of the latter to be shifted toward and away from the work table 4, 5. Each arm 9 may be fastened to the column 7 in the operative position by means of a bolt 22 which passes through aligned lugs 21 on the arm and column.

A perforated pad 6 of the foam rubber is adhesively fastened to the upper tooth carrier 2 and is covered by a thin relatively rigid sheet metal cover 20. The teeth 8 of the upper carrier 2 pass through openings in the pad 6 and the cover 20.

The afore-described apparatus is operated as follows:

Depending on the size of the piece of leather 3 which is to be worked, one or both arms 9 are swung into the operative position. The depth to which the teeth 8 of each carrier 1, 2 penetrate into the gaps between the teeth of the other carrier is adjusted by means of the handwheels 12, and may further be modified by changing the throw of the crankpin on the shaft 13.

Figure 3:
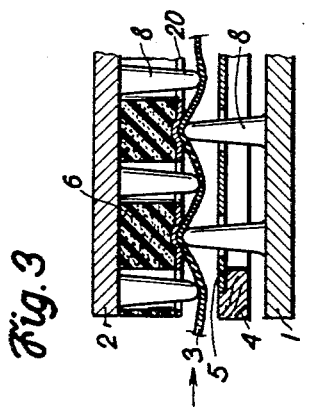
FIG. 3 shows a portion of the machine in side elevational section on a larger scale.
Figure 4:
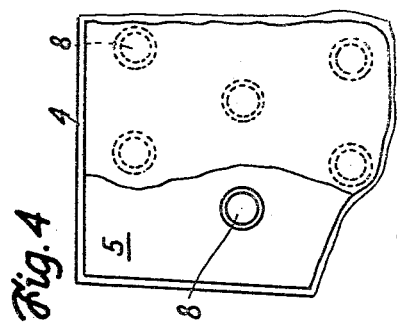
FIG. 4 illustrates the device of FIG. 3 in fragmentary plan view.

The piece 3 of leather is manually passed over the work table, as indicated by a horizontal arrow in FIGS. 1 and 3, while the lower tooth carrier 1 is oscillated by the motor 16 at a speed of approximately 5 to 30 cycles per second. The leather is released by the teeth 8 briefly during each cycle so that the movement of the leather piece through the work area is practically continuous, and the operator does not feel significant resistance to the movement.

While the teeth 8 of the lower carrier 1 move upward, they drive the leather 3 into the gaps between the teeth of the upper carrier 1, and into engagement with the cover 20 resiliently backed by the foam rubber pad 6. The pad 6 is compressed as the lower teeth move further upward from the position shown in FIG. 3, and its resilient expansion during downward movement of the lower teeth causes the leather portions received in the gaps of the upper teeth to be expelled. Movement of the leather through the working area is greatly facilitated by his arrangement, and damage to the leather is avoided.

The portion of the leather passing through the working area of the machine is flexed and thereby softened. The dwell time of each part of a leather piece in the working area can be individually selected by the operator as needed. The apparatus of the invention is therefore well suited for softening leather made from the skins of small animals for use in gloves and other fine leatherware.

It should be understood, of course, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

We claim:
1. A machine for softening leather and like sheet material comprising, in combination:
   (a) a support including means defining a normally horizontally extending work table formed with a plurality of perforations therein;
   (b) a first tooth carrier under said work table;
   (c) a plurality of teeth extending upward from said carrier in respective alignment with said perforations;
   (d) drive means on said support for oscillating said carrier between terminal positions in which said teeth simultaneously project above said work table and are downwardly retracted, respectively,
      (1) said teeth in said projecting position defining gaps therebetween;
   (e) a second tooth carrier;
   (f) mounting means for securing said second tooth carrier on said support above said work table in an operative position; and
   (g) a plurality of teeth extending downward from said second carrier in alignment with said gaps in said operative position of the second tooth carrier.

2. A machine as set forth in claim 1, further comprising yieldably resilient pad means interposed between the teeth of said second tool carrier.

3. A machine as set forth in claim 1, further comprising means for moving said second tooth carrier toward and away from said work table while maintaining said alignment of the teeth thereof with said gaps.

4. A machine as set forth in claim 1, said mounting means including an arm member, said second carrier being attached to said arm member, pivot means securing said arm member to said support for movement about a horizontal axis toward and away from said operative position of the attached second carrier, and fastening means for fastening said arm member to said frame in said operative position.

5. A machine as set forth in claim 1, further comprising yieldably resilient pad means interposed between the teeth of said second tool carrier, said pad means including a pad of yieldably resilient material adjacent said second carrier and extending between said teeth, and a perforated cover member on said pad and facing said work table in the operative position of the second tooth carrier, said cover member being of a material substantially stiffer than said pad, and the teeth on said second tooth carrier extending through the perforations of said cover member.

References Cited

UNITED STATES PATENTS

| 73,408 | 1/1868 | Tidd | 69—33 |
| 2,956,427 | 10/1960 | Blatz | 69—33 |

FOREIGN PATENTS 1,016,191  1/1966  Great Britain.

PATRICK D. LAWSON, *Primary Examiner.*

ALFRED R. GUEST, *Assistant Examiner.*